United States Patent [19]

Urbanus et al.

[11] Patent Number: 5,442,411
[45] Date of Patent: Aug. 15, 1995

[54] DISPLAYING VIDEO DATA ON A SPATIAL LIGHT MODULATOR WITH LINE DOUBLING

[75] Inventors: Paul M. Urbanus; Vishal Markandey, both of Dallas; Robert J. Gove, Plano, all of Tex.

[73] Assignee: Texas Instruments Incorporated, Dallas, Tex.

[21] Appl. No.: 176,618

[22] Filed: Jan. 3, 1994

[51] Int. Cl.$^6$ ............................................. H04N 5/74
[52] U.S. Cl. .................... 348/771; 348/759; 348/448; 345/84
[58] Field of Search ............... 348/771, 770, 759, 761, 348/448; 345/84, 85; H04N 5/74

[56] References Cited

U.S. PATENT DOCUMENTS

| | | | |
|---|---|---|---|
| 4,638,309 | 1/1987 | Ott | 345/84 |
| 4,815,035 | 3/1989 | Brooks | 345/97 |
| 5,192,946 | 3/1993 | Thompson et al. | 348/764 |
| 5,255,100 | 10/1993 | Urbanus | 348/770 |
| 5,266,937 | 11/1993 | DiSanto et al. | 345/84 |

OTHER PUBLICATIONS

R. Deubert, "Feature IC's For Digivision TV Sets," reprinted from *IEEE Transactions on Consumer Electronics, vol. CE-29, No. 3,* Aug., 1983, pp. 237–241.

S. Naimpally, et al., "Integrated Digital IDTV Receiver with Features," *IEEE Transactions on Consumer Electronics, vol. 34, No. 3,* Aug., 1988, pp. 410–419.

*Primary Examiner*—James J. Groody
*Assistant Examiner*—Chris Grant
*Attorney, Agent, or Firm*—Julie L. Reed; Richard L. Donaldson; Rene E. Grossman

[57] ABSTRACT

An SLM-based video receiver (10) receives a video input on a field-by-field basis at a signal interface unit (11) and passes the input to a processor (12). The processor (12) performs analog-to-digital conversion if the pixel data is analog and also performs other enhancements to prepare the pixel data for loading into a video memory (14). Pixel data from the processor (12), representing a field of pixel data, is stored into the memory (14) for loading into rows of pixel elements of a spatial light modulator (16). The spatial light modulator (16) receives the pixel data in rows. The addressing functions of the spatial light modulator (16) are used to generate additional display rows of pixel data per field. Thus, the SLM-based video receiver (10) displays a video frame having more lines than the field of pixel data.

20 Claims, 2 Drawing Sheets

DISPLAYING VIDEO DATA ON A SPATIAL LIGHT MODULATOR WITH LINE DOUBLING

TECHNICAL FIELD OF THE INVENTION

This invention relates to video display systems, and more particularly to a method and apparatus for displaying video data on a spatial light modulator.

BACKGROUND OF THE INVENTION

A recent development in video display systems is the use of spatial light modulators (SLMs) instead of raster-scan electronic beam devices. An SLM consists of an array of electronically addressable pixel elements. Each element emits or reflects light to be displayed on an image plane, such as a display screen. For many applications, an SLM is binary in the sense that each pixel element may have either of two states. The element may be off and deliver no light to the image planes or the element may be on and deliver light thereby forming an image.

One type of SLM suitable for use in display systems is the digital micro-mirror device (DMD), in which each pixel element is a tiny mirror capable of individual mechanical movement in response to an electrical input. Each pixel element of a DMD reflects and modulates incident light in direction, phase, or amplitude. Recent advances in the fabrication and use of SLMs, and DMDs in particular, permit a high pixel density for high quality video display systems.

SLMs are capable of addressing all pixel elements of each video frame simultaneously, rather than scanning them. Various techniques for exploiting this capability to provide high quality images are being developed.

SUMMARY OF THE INVENTION

One aspect of the invention is a method of using an SLM to generate display frames of pixel data derived from fields of an incoming video signal, where the number of display rows is greater than the number of rows of the field. The SLM comprises an array of pixel elements arranged in display rows. An input row of pixel data from the incoming field is received into an input register of the SLM. A first pixel subset of the input row is selected and a first row subset of the display rows is enabled to be loaded with the first pixel subset. A second pixel subset of the input row is selected and a second row subset of the display rows is enabled to be loaded with the second pixel subset. The second row subset has at least one display row that is in the first row subset. The above steps are repeated for successive input rows of the field, until the number of display rows loaded comprises a display frame.

A technical advantage of the invention is that it provides a method and apparatus for displaying video data that exploit SLM addressability. Address circuitry that enables SLM pixel elements can efficiently display a video frame from a field of interlaced video data. For example, for standard two-field interlaced video data, the invention loads a pair of adjacent display rows with odd pixel data. A next adjacent pair of display rows has one row from the previous pair and is loaded with even pixel data. In such a manner, all pixel elements on the SLM are loaded.

A further technical advantage of the invention is that it requires less video data processing and storage than other SLM display systems. By exploiting addressing functions residing on the SLM, the invention stores a single field of video data in memory to display an entire video frame on the SLM. Furthermore, by performing addressing and data manipulation at the SLM rather than at a processing component earlier in the data path, the amount of front end processing and the data bandwidth into the SLM are reduced.

BRIEF DESCRIPTION OF THE DRAWINGS

For a more complete understanding of the invention, and the advantages thereof, reference is now made to the following descriptions taken in conjunction with the accompanying drawings.

DETAILED DESCRIPTION OF THE INVENTION

Figure 1:
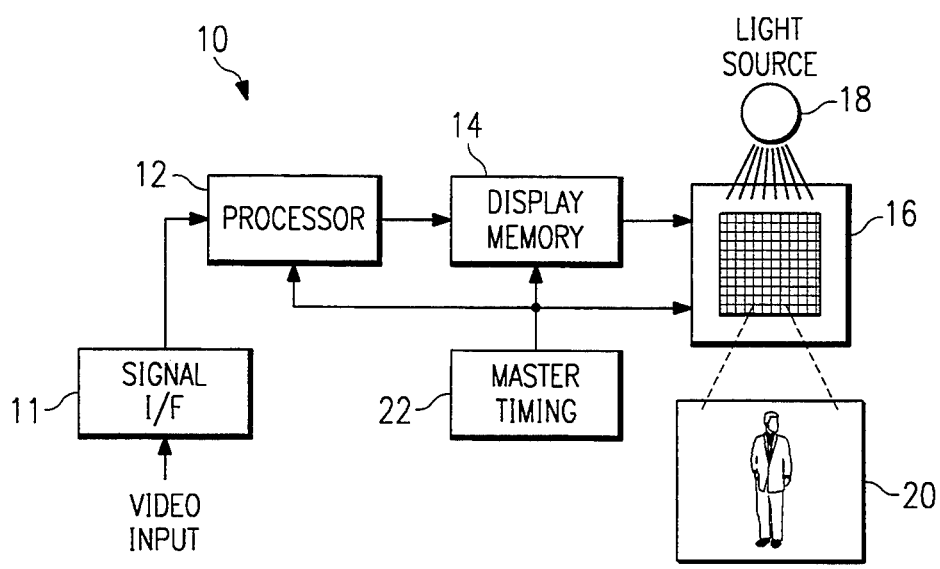
FIG. 1 is a block diagram of an SLM video display system constructed according to the teachings of the invention.

FIG. 1 illustrates a receiver 10 constructed in accordance with the invention. Receiver 10 is only one application of the invention, and other applications may be implemented using the same concepts described below. A specific example of receiver 10 of FIG. 1, and the example used throughout this description, is a television display system.

For purposes of the example used throughout this description, the incoming video signal is a National Television Standards Committee (NTSC) interlaced video signal, sampled for 480 rows and 640 columns of pixels. "Interlaced" means that for standard display systems, each frame of video data has two fields. A first field includes the even rows of the video frame. A second field includes the odd rows of the same video frame. Non-standard display systems convert fields to frames rather than de-interlace them. The process of converting even and odd fields of data into display frames is sometimes referred to as "progressive scan conversion."

The video data may also be in other standard video formats, such as Phase Alternating Line (PAL), Sequential Color with Memory (SECAM), and Society of Motion Pictures and Television Engineers (SMPTE), among others. Non-interlaced video input could also be used to display frames of data in accordance with the invention, where each display frame has a number of rows that is greater than the number of rows in each field of the incoming video signal. Fields are defined by some sort of signal, such as the vertical sync signal of the NTSC format. For purposes of this description, the process of generating display frames from fields by generating additional lines, including progressive scan conversion, is referred to as "generating display frames."

The video input to receiver 10 may come from a variety of sources, including land-based transmissions received over an antenna, coaxial cable transmissions, digital fiber optic line transmissions, and satellite transmissions, among others. The video input may also be digital, obviating the need for an analog to digital conversion in processor 12. Therefore, the video display system of FIG. 1 contemplates receiving monochrome or color video data, either analog or digital, and from a variety of transmission media.

The following description of receiver 10 emphasizes those aspects relevant to SLM addressing in accordance with the invention. Further details about display systems, such as receiver 10, for use with a DMD-type SLM 16, are set out in U.S. Pat. No. 5,079,544, entitled "Standard Independent Digitized Video System"; U.S. Pat. Ser. No. 08/147,249, Attorney Docket No. TI-17855, entitled "Digital Television System"; U.S. Pat. Ser. No. 07/678,761,entitled "DMD Architecture and Timing for Use in a Pulse-Width Modulated Display System"; U.S. Pat. Ser. No. 07/809,816, entitled "White Light Enhanced Color Field Sequential Projection"; and U.S. Pat. Ser. No. 08/146,385, Attorney Docket No. TI-17671, entitled "DMD Display System". Each of these patents and patent applications is assigned to Texas Instruments Incorporated, and each is herein incorporated by reference.

As an overview of the operation of receiver 10, signal interface unit 11 receives a video input of some standardized format containing pixel data and passes the input to processor 12. Processor 12 performs analog to digital conversion if the pixel data is analog and performs other processing tasks to prepare the pixel data for display.

Memory 14 has a capacity of at least one field of pixel data. As explained below, memory 14 provides pixel data to all pixel elements of SLM 16, using a stored single field of pixel data. The number of rows of pixel data stored in memory 14 is a subset of the number of display rows of SLM 16. However, by exploiting the addressability of SLM 16, the rows of pixel data fill all of the display rows, thereby loading a complete display frame from a field of pixel data.

Although the invention contemplates any memory device to store the pixel data, one particular example is a video random access memory (VRAM). A VRAM includes an internal parallel in/serial out shift register that can be accessed independently from the rest of the memory unit. In one memory cycle, the VRAM transfers an entire row of pixel data from memory to the shift register for delivery to SLM 16. The VRAM memory continues to accept input data during read out from the shift register. Such a VRAM allows higher throughput of data in the SLM-based video receiver. An example of a suitable VRAM is the TMS4161 integrated circuit, manufactured by Texas Instruments Incorporated.

SLM 16 is an array of electronically addressable pixel elements, and more particularly for purposes of this description, a digital micro-mirror device (DMD). An example of SLM 16 is the DMD manufactured by Texas Instruments Incorporated, in which each pixel element has a pixel mirror connected to a memory element that stores at least one bit of data. The DMD receives a desired state of each pixel element into its corresponding memory element. Upon loading all memory elements, SLM 16 may switch all pixel elements simultaneously. For purposes of this description, a one-to-one correspondence between memory elements and pixel mirrors is assumed. However, in other SLMs 16, "pixel elements" may have a shared memory element.

The invention applies not only to DMDs, but also to other binary SLMs having addressable pixel elements. A suitable SLM 16 receives pixel data corresponding to rows of pixel elements. Because the data stored in rows of SLM 16 are not necessarily coincident with rows of data in memory 14, the former data are referred to as "display rows" and the latter data as "memory rows," "rows of video data," or "rows of pixel data".

Receiver 10 may display intermediate levels of light using a variable intensity technique, such as pulse-width modulation. Pulse-width modulation uses various schemes for loading SLM 16, including "bit-plane" loading, in which one bit per pixel for an entire frame is loaded at one time. For pixel data having an 8-bit value per pixel, SLM 16 is loaded eight times per display cycle, with the load timing governed by the particular modulation scheme. Therefore, a pixel element may switch states multiple times in a single display cycle.

U.S. Pat. Ser. No. 07/678,761, referenced above, describes a method of pulse-width modulation where SLM 16 loads the most significant bit for one half of a display cycle, the second most significant bit for one fourth of a display cycle, and so on. The loading occurs in bit-plane bursts, during a "least significant bit time," which is calculated by dividing the display cycle into $2^N - 1$, where N is the resolution of each pixel. For example, for eight bit pixel resolution and sixty display cycles each second, the least significant bit time is 65.36 microseconds. SLM 16 may operate at sixty display cycles each second, which is the field transmission rate of standardized NTSC interlaced data, since the addressing techniques of the invention allow SLM 16 to display a complete frame for each field of video data received.

To display a black and white image, receiver 10 processes a single channel of pixel data. To display a color image, receiver 10 processes several channels or several pixel data components in color space. For example, a first component represents a red video signal, a second component a green video signal, and a third component a blue video signal. It is understood that the number and color of the pixel data components in color space may vary without departing from the teachings of the invention.

SLM 16 can display these pixel data components representing a color image in a sequential or nonsequential manner. A nonsequential color system uses one SLM 16 for pixel data of each color. Light source 18 in a nonsequential system comprises, for example, separate blue, green, and red light sources to be reflected against SLMs 16. In contrast, a sequential color system processes one SLM 16 that sequentially receives each pixel data component. The light source 18 in a sequential system may be, for example, a color wheel that sequentially illuminates the pixel element array with red, blue, and green light. One example of sequential color imaging is described in pending U.S. Pat. Ser. No. 08/179,028, entitled "Method and Apparatus for Sequential Color Imaging," herein incorporated by reference.

Receiver 10 of FIG. 1, therefore, contemplates displaying a monochrome image, or a color image using any appropriate sequential or nonsequential methodology. Light source 18, shown as a separate element from SLM 16 in FIG. 1, is used if the individual pixel elements include adjustable mirrored surfaces that reflect light. However, if the individual pixel elements of SLM 16 are capable of generating light, like light emitting diodes (LEDs), light source 18 is not used.

Image plane 20 receives the reflected or emitted light from SLM 16. Image plane 20 can be a screen of a back-lit system, such as a television, where the viewer is on an opposite side of the screen from the reflected or emitted light from SLM 16. Image plane 20 can also be a screen of a projection system where the reflected or emitted light is located on the same side of the screen as the viewer. Master timing circuitry 22 coordinates the timing between processor 12, memory 14, and SLM 16.

FIG. 1 shows SLM 16 containing an array of pixel elements as a separate component of receiver 10. It is understood, however, that any combination of signal interface 11, processor 12, memory 14, SLM 16, light source 18, image plane 20, master timing circuitry 22, and any other related circuitry can be integral to receiver 10 or separate components of an overall video display system. For example, SLM 16, memory 14, and part or all of master timing circuitry 22 could reside on a single fabricated chip.

Figure 2:
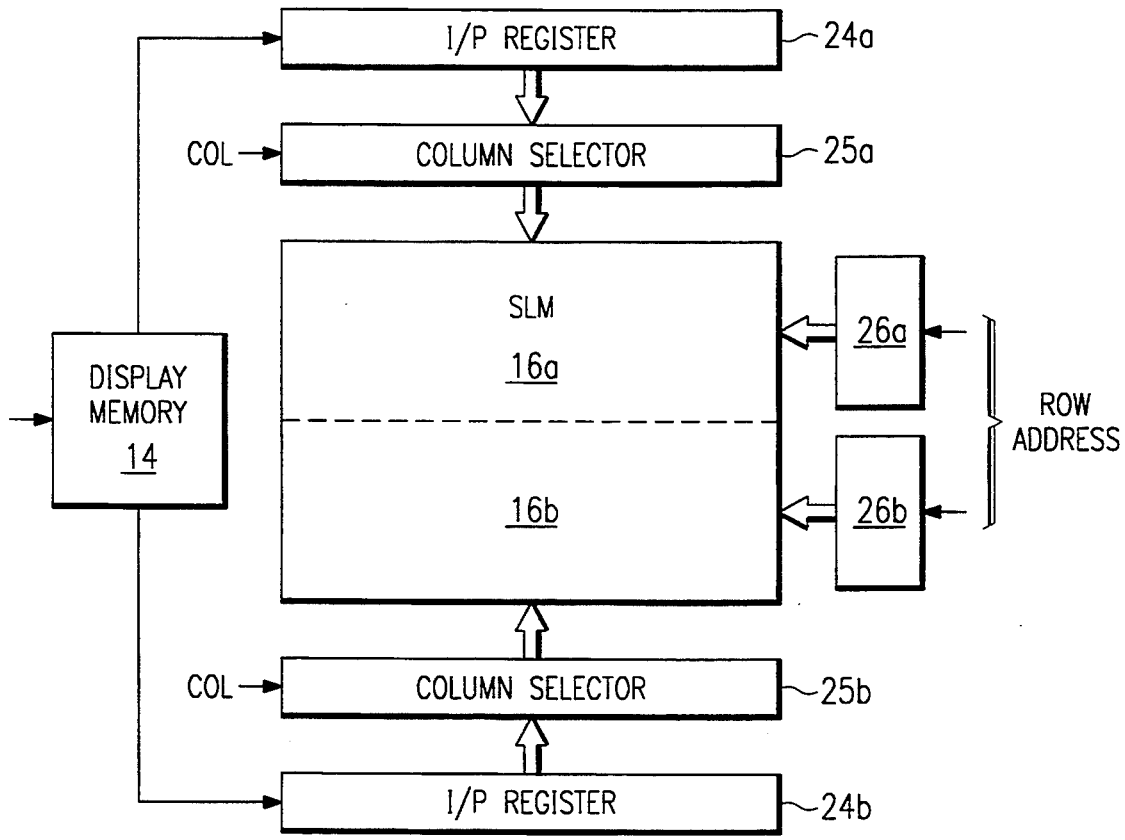
FIG. 2 is a block diagram of an SLM constructed according to the teachings of the invention.

FIG. 2 illustrates SLM 16 in further detail. In this particular embodiment, SLM 16 is partitioned, such that it receives pixel data simultaneously into upper pixel array 16a and lower pixel array 16b. However, the invention is easily adapted to nonpartitioned SLMs or SLMS that are partitioned in some other manner.

SLM 16 receives pixel data from memory 14 into input registers 24a and 24b. Loading video data from memory 14 to either upper or lower pixel arrays of SLM 16 is identical. Therefore, now referring to upper pixel array 16a, memory 14 outputs a row of pixel data to input register 24a. In one embodiment of the invention, input register 24a receives pixel data for a designated display row with the number of bits equal to the number of columns of pixel elements of SLM 16. Input register 24a may contain parallel latches that increase throughput by storing a first row of pixel data while the register receives a second row of pixel data from memory 14. In the example of this description, input register 24a, and any additional latches or drivers, processes a 640 bit row of pixel data corresponding to the 640 columns of SLM 16. It should be understood that the invention also contemplates direct connections between memory 14 and the columns of SLM 16 without the interposition of an input register.

Column selector 25a responds to a control signal COL by passing a subset of the pixel data stored in input register 24a to the pixel array 16a. This subset of pixel data is referred to herein as a "pixel subset." The control signal COL may be a single bit with two states representing, for example, a selection of the even pixel data or the odd pixel data stored in input register 24a. In alternative embodiments, control signal COL could be two or more bits wide, allowing selection of several pixel subsets. The control signal COL received by column selector 25a may be generated in memory 14, or alternatively in master timing circuitry 22, processor 12, or by other appropriate SLM circuitry. Column selector 25a may also contain column drivers that drive each bit in the selected pixel subset to each corresponding column of pixel array 16a.

Row selector 26a receives one or more display row addresses to enable two or more display rows in pixel array 16a to receive the selected pixel subset from column selector 25a. A display row address received by row selector 26a may be generated in memory 14, or alternatively in master timing circuitry 22, processor 12, or by other appropriate SLM circuitry. In one embodiment, row selector 26a is a decoder that receives display row addresses that represent 240 display rows to be enabled in pixel array 16a. Row selector 26a decodes display row addresses and asserts enable lines to enable the selected display rows. Row selector 26a may mask the least significant bit of a display row address, thereby simultaneously enabling two adjacent rows. Furthermore, row selector 26a may sequentially or simultaneously assert two display row enable lines in response to receiving one or more display row addresses. Each set of two or more display rows thus enabled is referred to herein as a "display row subset."

Pixel array 16a comprises rows of pixel mirrors, each pixel mirror connected to a memory element to store the state of the mirror. A pixel element, comprising a pixel mirror and its associated memory element, is "loaded" by storing a desired state in its corresponding memory element, such as "0" or "1" if the pixel element operates as a binary device. The pixel element is then "reset" by altering the state of the pixel element to correspond to the desired state stored in its memory element.

During operation of SLM 16, memory 14 stores at least one field of interlaced pixel data, each field having 240 rows of data. As explained below, each field is used to create a display frame having twice as many rows. In other examples, memory 14 could store a field to be displayed on SLM 16 with two, three, or more times the number of display rows than rows of pixel data stored in memory 14. For example, the method described herein could be used to generate 720 display rows from 240 rows of pixel data. Therefore, the process could be used to selectively generate any number of display rows per frame.

For standard interlaced data, memory 14 stores in succession rows of pixel data corresponding to the odd and even rows of SLM 16. For example, for display cycle one, memory 14 stores rows of pixel data for odd display rows, and for display cycle two, memory 14 stores rows of pixel data for even display rows. To display a complete video frame, in other words to load all display rows of SLM 16 with pixel data, adjacent display rows are loaded with the same pixel subsets stored in input register 24a. This is accomplished through addressing techniques without an appreciable increase in memory or processing.

Figure 3:
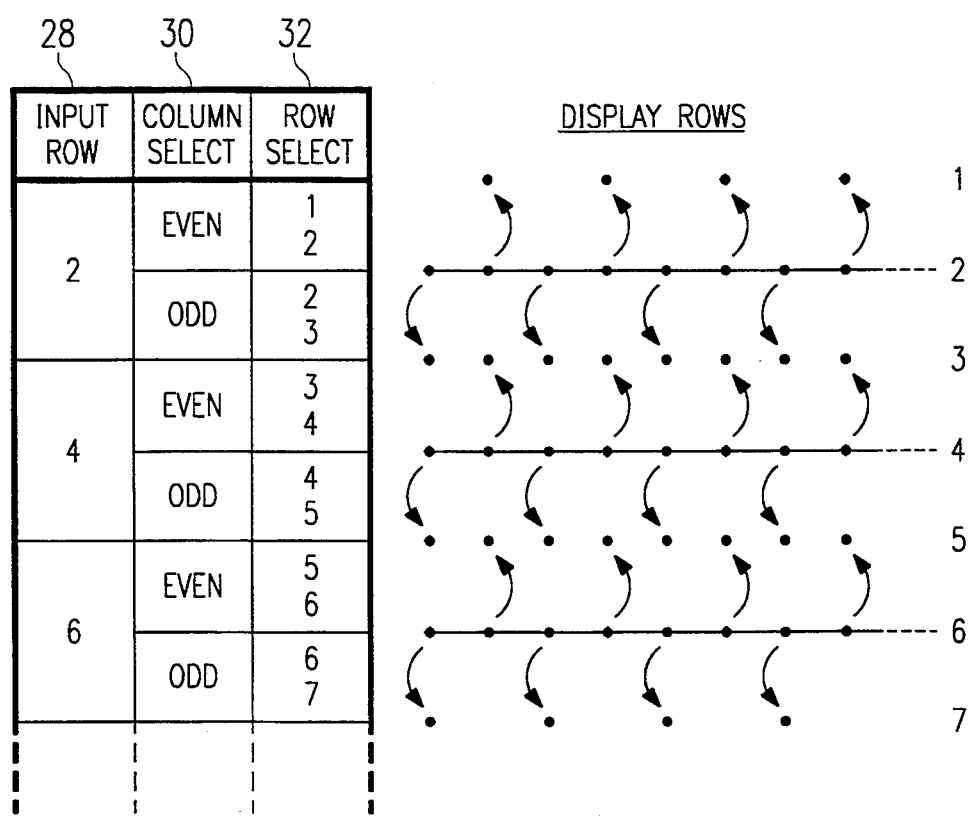
FIG. 3 illustrates the loading method used in accordance with the teachings of the invention.

FIG. 3 illustrates the loading method of the invention which loads pixel data into SLM 16. The loading method cycles through various combinations of three variables shown in FIG. 3: input row 28, column select 30, and row select 32. Now referring to the loading of upper pixel array 16a, input row 28 represents a row of pixel data stored in input register 24a. Column select 30 represents the state of control signal COL received by column selector 25a to select either the even pixel data or the odd pixel data from input row 28. Row select 32 represents the display rows enabled by row selector 26a to be loaded with the selected pixel data.

In operation, the loading method receives pixel data for a display row into input register 24a. For the example of this description, input row 28 comprises input rows 2, 4, 6, etc. of an even field stored in memory 14. The loading method performs two loading steps for each row of pixel data, each step loading a pair of adjacent display rows with either even or odd pixel data. The first step selects even pixel data of input row 2 and enables display rows 1 and 2 to be loaded with the even pixel data. This operation is shown graphically in FIG. 3, where even pixel data is loaded into even pixel elements of display rows 1 and 2.

The second step selects the odd pixel data of input row 2 and enables display rows 2 and 3 to be loaded with the odd pixel data. By successively enabling overlapping pairs of display rows (1-2 and 2-3) the loading method completely fills display row 2 with both even and odd pixel data from input row 2. In the second step, odd pixel data is also loaded into odd pixels of display row 3.

The loading method continues by receiving input row 4 and performing the same two-step loading operation for its even and odd pixel data. After the first step, display row 3 contains the odd pixels from input row 2 and the even pixels from input row 4. The second loading step completes the loading of display row 4 and loads display row 5 with the odd pixel data. The same even/odd two-step loading method continues for each input row until all display rows of SLM 16 receive pixel data.

The even/odd loading method illustrated in FIG. 3 may be altered slightly to an odd/even loading method. In such a manner, odd pixel data for an input row is loaded into a selected display row and a display row immediately above and the even pixel data is loaded into the selected display row and a display row immediately below. Furthermore, receiver 10 may alternate between the even/odd and odd/even loading method for each successive field of video data stored in memory 14.

The loading method illustrated in FIG. 3 presumes a two-field frame of pixel data, but the invention generally teaches selecting a pixel subset stored in input register 24a and enabling a display row subset to receive the selected pixel subset. For example, a display frame having three display rows per input row may be generated in accordance with the invention. Instead of two loading steps for each input row of pixel data, this approach uses three steps, where each step loads a pixel subset representing every third pixel stored in input register 24a.

The first loading step loads the first pixel subset into a selected display row and two display rows immediately above. The second loading step loads a second pixel subset into the selected display row, a display row immediately above, and a display row immediately below. The third loading step loads the third pixel subset into the selected display row and two display rows immediately below.

The three-step loading method overlaps display row subsets such that the selected display row receives all pixel subsets of the input row stored in input register 24a. Furthermore, display rows adjacent to the selected display row receive two pixel subsets from an input row stored in input register 24a and one pixel subset from another input row. The same loading method may be applied in a similar manner using any number of pixel subsets.

As discussed above, column selector 25a may select any pixel subset stored in input register 24a. For example, the pixel subsets may be odd and even pixels, but can also be every third, fourth, or other interval of pixels. In addition, a pixel subset may comprise every other grouping of two, three, or more pixels.

There have been described certain embodiments of the invention that are capable of displaying a video frame from a field of pixel data without an a appreciable increase in pixel data processing and storage. While these embodiments have been described and disclosed, other changes, substitutions, or alterations can be made without departing from the spirit and scope of the invention, as described in the appended claims.

What is claimed is:

1. A spatial light modulator for generating display frames from fields of an incoming video signal, comprising:

column lines for delivering pixel data to an array of pixel elements;

a column selector coupled to said column lines for selecting subsets of each row of pixel data in response to a control signal that designates which subsets of data will be selected, wherein said subsets of each row of pixel data comprise pixel data for said column lines;

said array of pixel elements arranged in display rows, said display rows coupled to said column lines such that said pixel elements may be loaded with a selected subset of pixel data; and a row selector connected to said display rows by enable lines for enabling at least two adjacent display rows to be loaded with said selected subset of pixel data.

2. The spatial light modulator of claim 1, wherein said control signal has a plurality of states, said column selector further comprising circuitry for selecting a subset of pixel data in response to a state of said control signal.

3. The spatial light modulator of claim 1, wherein said control signal has a first state and a second state, said column selector further comprising circuitry for selecting odd pixel data for said first state and circuitry for selecting even pixel data for said second state.

4. The spatial light modulator of claim 1, wherein said row selector further comprises circuitry for successively enabling overlapping groups of display rows.

5. The spatial light modulator of claim 1, wherein said row selector further comprises circuitry for successively enabling overlapping pairs of display rows, and wherein each pair of enabled display rows receives a selected subset of pixel data, said selected subset of pixel data alternating between odd pixel data and even pixel data for each successive pair of display rows.

6. The spatial light modulator of claim 1, wherein said array of pixel elements is an array of digital micro-mirror pixel elements.

7. The spatial light modulator of claim 1, and further comprising an input register coupled to said column lines for receiving pixel data.

8. The spatial light modulator of claim 1, and further comprising an input register coupled to said column lines for receiving pixel data, wherein said column selector selects subsets of each row of pixel data at the output of said input register.

9. A method of using a spatial light modulator to generate display frames of pixel data derived from input rows of pixel data representing a field of an incoming video signal, said spatial light modulator comprising an array of pixel elements arranged in display rows, comprising the steps of:

receiving an input row of pixel data into a store of said spatial light modulator;

selecting a first pixel subset of said input row;

enabling a first row subset of display rows to be loaded with said first pixel subset;

loading said first pixel subset into said first row subset;

selecting a second pixel subset of said input row;

enabling a second row subset of display rows to be loaded with said second pixel subset, wherein said second row subset has at least one display row that is in said first row subset;

loading said second pixel subset into said second row subset; and repeating the above steps for successive input rows of said field, such that the number of display rows loaded in said loading steps comprises a display frame.

10. The method of claim 9, and further comprising the step of repeating said selecting, enabling, and loading steps for a predetermined number of pixel subsets per input row.

11. The method of claim 9, wherein said selecting steps comprise selecting alternating samples of pixel data.

12. The method of claim 9, wherein said receiving step is performed by means of an input register.

13. The method of claim 9, wherein said receiving step is performed by means of a parallel latch.

14. The method of claim 9, wherein the steps of selecting a pixel subset are performed by:

receiving a control signal having a plurality of states; and selecting a pixel subset in response to a state of said control signal.

15. The method of claim 9, wherein the steps of selecting a pixel subset are performed by receiving a control signal having a first state selecting odd pixel data and a second state selecting even pixel data.

16. A video display system for displaying a video frame derived from pixel data representing a field of an incoming video signal, comprising:

a processor for preparing said pixel data for storage;

a memory coupled to said processor for storing said pixel data;

column lines coupled to said memory for delivering said pixel data to an array of pixel elements;

a column selector coupled to said column lines for selecting subsets of each row of pixel data;

said array of pixel elements arranged in display rows, said display rows coupled to said column lines such that said pixel elements may be loaded with a selected subset of pixel data, wherein said subset of pixel data comprises data for said column lines;

a row selector connected to said display rows by enable lines for enabling at least two adjacent display rows to be loaded with said selected subset of pixel data;

reset circuitry to switch pixel elements in response to received pixel data; and a light source reflecting off switched pixel elements to project said video frame on an image plane for display.

17. The system of claim 16, wherein said column selector receives a control signal having a plurality of states, said column selector further comprising circuitry for selecting a subset of pixel data in response to a state of said control signal.

18. The system of claim 16, wherein said column selector receives a control signal having a first state and a second state, said column selector further comprising circuitry for selecting odd pixel data for said first state and circuitry for selecting even pixel data for said second state.

19. The system of claim 16, wherein said row selector further comprises circuitry for successively enabling overlapping groups of display rows.

20. The system of claim 16, wherein said array of pixel elements is an array of digital micro-mirror pixel elements.

* * * * *